(12) United States Patent
Mohan et al.

(10) Patent No.: US 10,883,055 B2
(45) Date of Patent: Jan. 5, 2021

(54) METHOD FOR SELECTIVE EXTRACTION OF SURFACTANTS FROM CRUDE OIL

(71) Applicant: ExxonMobil Research and Engineering Company, Annandale, NJ (US)

(72) Inventors: Aruna Mohan, Annandale, NJ (US); Mohsen S. Yeganeh, Hillsborough, NJ (US); Daniel P. Cherney, Hampton, NJ (US); Anthony S. Mennito, Flemington, NJ (US); Shane P. Deighton, Bound Brook, NJ (US); Jessica L. Vreeland, Phillipsburg, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 37 days.

(21) Appl. No.: 15/935,471

(22) Filed: Mar. 26, 2018

(65) Prior Publication Data

US 2018/0291286 A1 Oct. 11, 2018

Related U.S. Application Data

(60) Provisional application No. 62/481,854, filed on Apr. 5, 2017.

(51) Int. Cl.
*C10G 53/12* (2006.01)
*E21B 43/20* (2006.01)
*C09K 8/584* (2006.01)

(52) U.S. Cl.
CPC .............. *C10G 53/12* (2013.01); *C09K 8/584* (2013.01); *E21B 43/20* (2013.01); *C10G 2300/203* (2013.01)

(58) Field of Classification Search
None
See application file for complete search history.

(56) References Cited

U.S. PATENT DOCUMENTS 2,001,108 A * 5/1935 Parker ...................... C10M 1/08
252/400.51
3,111,985 A * 11/1963 Reisberg ................ C09K 8/584
166/270.1

(Continued)

OTHER PUBLICATIONS

Nodwell; On the Interactions between Naphthenic Acids and Inorganic Minerals; 2011; 72 Pages (Year: 2011).*

(Continued)

*Primary Examiner* — Anuradha Ahuja
(74) *Attorney, Agent, or Firm* — Joseph E. Wrkich; Priya G. Prasad; Leandro Arechederra, III (57) ABSTRACT

A method for selective extraction of naphthenic acids from an acidic crude oil, including: providing an acidic crude oil including naphthenic acids and having a total acid number (TAN) greater than 0.4; mixing the acidic crude oil with a first aqueous solution including water and a weak base to extract a portion of naphthenic acids from the acidic crude oil thereby creating a second aqueous solution containing a mixture of the portion of naphthenic acids, the water and the weak base in an emulsion; separating the second aqueous solution from the emulsion; wherein the second aqueous solution contains an additional portion of the acidic crude oil; adding a salt to the second aqueous solution, thereby causing the additional portion of the acidic crude oil to separate from the second aqueous solution; removing the additional portion of the acidic crude oil from the second aqueous solution; and extracting the portion of the naphthenic acids from the second aqueous solution.

8 Claims, 8 Drawing Sheets

(56) References Cited

U.S. PATENT DOCUMENTS

| | | | | |
|---|---|---|---|---|
| 3,174,542 A | * | 3/1965 | Reisberg | C09K 8/584 |
| | | | | 166/270.1 |
| 3,380,531 A | * | 4/1968 | McAuliffe | C09K 8/60 |
| | | | | 166/371 |
| 3,502,147 A | * | 3/1970 | Hill | C09K 8/58 |
| | | | | 166/270.1 |
| 3,929,190 A | * | 12/1975 | Chang | C09K 8/584 |
| | | | | 166/272.1 |
| 3,929,194 A | | 12/1975 | Chang et al. | |
| 4,008,769 A | | 2/1977 | Chang | |
| 4,037,656 A | | 7/1977 | Cooper | |
| 4,232,738 A | | 11/1980 | Yen et al. | |
| 4,494,604 A | * | 1/1985 | Shaw | C09K 8/584 |
| | | | | 166/270.1 |
| 6,627,069 B2 | | 9/2003 | Greaney | |
| 2010/0155304 A1 | | 6/2010 | Ding et al. | |
| 2012/0132564 A1 | * | 5/2012 | Hardacre | C10G 21/27 |
| | | | | 208/14 |
| 2014/0263088 A1 | * | 9/2014 | Mason | C02F 1/727 |
| | | | | 210/747.9 |
| 2014/0346056 A1 | * | 11/2014 | Kling Miller | C02F 9/00 |
| | | | | 205/761 |
| 2018/0134944 A1 | * | 5/2018 | Jaishankar | C09K 8/588 |

OTHER PUBLICATIONS

Hutin et al., "Mass transfer between crude oil and water. Part 1: Effect of oil components", Energy & Fuels, 2014, 28, 7331-7336.

Rowland et al., "Solid-phase extraction fractionation to extend the characterization of naphthenic acids in crude oil by electrospray ionization fourier transform ion cyclotron resonance mass spectrometry", Energy & Fuels, 2014, 28, 5043-5048.

\* cited by examiner

METHOD FOR SELECTIVE EXTRACTION OF SURFACTANTS FROM CRUDE OIL

CROSS-REFERENCE TO RELATED APPLICATIONS

This application claims the benefit of U.S. Provisional Application No. 62/481,854, filed on Apr. 5, 2017, the entire contents of which are incorporated herein by reference.

FIELD

The present application relates to processes for extracting naturally occurring surface active naphthenic acids from acidic crude oils.

BACKGROUND

In the recovery of oil from oil-bearing reservoirs, it is usually possible to recover minor portions of the original oil in place by primary recovery methods which utilize only the natural forces present in the reservoir. Thus, a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobility of the reservoir oil and injected water, and the wettability characteristics of the rock surfaces within the reservoir are factors which influence the amount of oil recovered by waterflooding. Thus, surfactants have been added to the injected water in order to lower the oil-water interfacial tension and/or to alter the wettability characteristics of the reservoir rock.

Commercially manufactured surfactants come at high cost. Acidic crude oil reserves with a high total acid number (TAN), e.g. greater than 0.4, have naturally occurring surface active naphthenic acids. As used herein, "total acid number" is defined as the amount of potassium hydroxide (KOH) in milligrams required to neutralize one gram of crude oil. Extracting these surfactants from existing crudes has several benefits. Surfactants extracted from crude oils provide a less expensive alternative to commercially manufactured surfactants. Furthermore, naphthenic acids in crude oil cause corrosion in refineries and pipelines and may stabilize undesirable emulsions on contact with water. The removal of these naphthenic acids through extraction assists in crude oil upgrading and consequently enhances the value of the crude.

U.S. Pat. No. 3,929,190 titled "Secondary Oil Recovery by Water Flooding with Extracted Petroleum Acids" to Chang et al. (Mobil Oil Corporation) (hereinafter "Chang" or "the '190 patent") teaches a method of oil recovery wherein a petroleum oil is contacted with an aqueous alkaline solution to extract organic acids from the oil into the aqueous medium, separating the aqueous solution from the oil, and injecting the aqueous solution into the reservoir. Reinjection of the aqueous solution into the same reservoir is not a favorable use for the extracted acids. Reinjecting surfactants into the same field produces no benefit compared to alkaline injection alone. This is because the surfactants are being extracted with alkali, so reinjecting them into the same reservoir simply adds the surfactants back to the reservoir that already contains these surfactants. The benefit of these acid molecules is realized by using the extracted surfactants at a different field with crudes that do not contain these natural surfactants. However, it is not favorable to transport the large volume of aqueous solution to a different reservoir, and it is necessary to concentrate the desirable surface-active acid molecules for transportation. In addition, Chang promotes the addition of a polymer to his aqueous solution to achieve a lower residual oil saturation than that achievable by injecting alkali alone (FIG. 2 and col. 8 of the '190 patent).

Chang extracts all naphthenic acids from the crude oil using a strong base (sodium hydroxide) as the alkali, which results in undesirably high pH >11 of the aqueous injection fluid. Chang states that the preferred pH is in the range of 11.5-13. Injection fluids of pH >11 are considered undesirable, as they lead to scaling, and wellbore and formation damage. In other words, Chang cannot selectively extract certain desired naphthenic acids, but rather extracts the naphthenic acids from the crude oil in an uncontrolled manner. Chang states:

> While onsite extraction offers the advantage of relatively simple logistics, the average molecular weight and molecular weight distribution of neutralized organic acids in the resulting extract will be largely uncontrolled since the extraction process is not selective with respect to molecular weight.

Chang et al., col. 6, ll. 17-24. Chang also states that the water employed in making the alkaline solution should be relatively fresh, normally containing less than 500 ppm dissolved salts, since a high salt content will retard the extraction process. In other words, Chang does not consider the possibility of using salt to extract certain desired naphthenic acids. Chang goes on to state that in order to extract organic acids within a desired molecular weight range, the extraction process may take place at different stages in refining processes. Id., col. 6, ll. 25-28. Put another way, because Chang cannot control what naphthenic acids are extracted from the crude oil, he proposes to control what naphthenic acids are extracted with different refining operations. This results in loss of efficiencies when compared to performing the extraction in the field.

U.S. Pat. No. 4,008,769 titled "Oil Recovery by Microemulsion Injection" to Chang (Mobil Oil Corporation) teaches the use of a co-surfactant in conjunction with the extracted organic acids from a petroleum oil in the aqueous medium, as described in the '190 patent.

U.S. Pat. No. 4,037,656 titled "Oil Recovery Method Employing Acids Extracted from Crude Using an Ion Exchange Process" to Cooper (Mobil Oil Corporation) teaches the use of ion exchange based on quaternary ammonium resins in carbonate or hydroxide form to extract naphthenic acids from acidic crude, and the injection of the extracted acids in conjunction with an aqueous caustic solution for oil recovery. The required pH of the injection fluid is greater than 11, and can be as high as 13. This patent states that the acids extracted were found to be insoluble in aqueous systems even at pH values of 12 or above. The injection of fluid at such high pH is known to cause operational problems such as scaling, and wellbore and formation damage. Moreover, strongly basic quaternary ammonium ion exchange resins extract all acids from the crude, including higher molecular weight components of low water solubility. As stated in the '190 patent, "[T]he interfacial tension reduction mechanism is particularly enhanced by the lower molecular weight acids, with those of higher molecular weight contributing progressively less to this mechanism and more to emulsification and wettability alteration." Chang et al., col. 6, ll. 42-47. As a result, the whole acids obtained from strong base ion exchange are largely oil soluble, and not effective as EOR surfactants, which must be dissolved in an aqueous injection fluid.

U.S. Pat. No. 4,232,738 titled "Petroleum Recovery Processes Using Native Petroleum Surfactants" (University of Southern California) teaches the injection of a nonaqueous slug comprising natural surfactants recovered from petroleum by distillation under conditions of 1 Torr in the temperature range of 100-200° C., followed by alkaline flood water injection, for oil recovery.

U.S. Pat. No. 4,494,604 titled "Extraction of Acidic Materials from Organic Liquids and Use Thereof in Enhanced Oil Recovery" (Phillips Petroleum Company) teaches the extraction of acidic materials from organic liquids including crude oils by contacting with an aqueous polar organic solvent solution of potassium hydroxide. The polar organic solvent may be an organic liquid containing oxygen, sulfur or nitrogen heteroatoms, with functional groups such as amines, amides, nitriles or alcohols. Further claims include the injection of the extracted acidic materials or their salts in conjunction with an aqueous displacing medium to recover crude oil.

U.S. Pat. No. 6,627,069 titled "Method for Reducing the Naphthenic Acid Content of Crude Oil and Its Fractions" (ExxonMobil Research and Engineering Company) teaches the use of potassium hydroxide, sodium hydroxide and/or ammonium hydroxide mixtures in conjunction with a phase transfer agent (such as a quaternary ammonium salt) to extract naphthenic acids from crudes into the aqueous phase. The context provided in the patent is the reduction of corrosion induced by naphthenic acids during crude transportation and processing.

U.S. Patent Publication No. US 2010/0155304 titled "Treatment of Hydrocarbons Containing Acids" (Kirby Eades Gale Baker, Ottawa, Canada) teaches the use of an alkaline compound in aqueous phase to extract naphthenic acids from crude, in conjunction with a phase transfer catalyst (such as a tetraalkyl ammonium compound) to convert the naphthenate salts into oil soluble esters. The patent claims that the method enables the naphthenic acids to be converted to noncorrosive compounds in an economic manner.

Hutin et al., *Mass Transfer between Crude Oil and Water. Part 1: Effect of Oil Components*, ENERGY & FUELS, vol 28, pp. 7331-7336, 2014, study the mass transfer of acidic and basic components from crude oils into the aqueous phase, where the pH of the aqueous phase is controlled by addition of sodium hydroxide or hydrochloric acid.

Rowland et al., *Solid-Phase Extraction Fractionation To Extend the Characterization of Naphthenic Acids in Crude Oil by Electrospray Ionization Fourier Transform Ion Cyclotron Resonance Mass Spectrometry*, ENERGY & FUELS, vol 28, pp. 5043-5048, 2014, separate naphthenic acids from crude oil into molecular weight fractions by adsorbing them on an aminopropyl silica column and eluting them from the column by varying the polarity of the solvent, and characterize the separated naphthenic acid fractions using mass spectrometry.

The above-mentioned publications describe methods for the extraction or removal of naphthenic acids components from crude oil by employing alkaline solutions, ion exchange columns, distillation or solvent extraction. However, they do not discuss the selective concentration of surface active molecules that are water-soluble and provide low interfacial tension against an oil phase. EOR surfactants are dissolved in aqueous phase and injected in the reservoir for oil recovery. Partitioning of the surfactants into oil is considered undesirable due to ensuing surfactant loss to the oil phase and the potential for formation of water-in-oil emulsions, which cause problems at the refinery. It would be beneficial to isolate interfacially active naphthenic acids from crude that form oil-in-water emulsions or microemulsions and are suitable for EOR applications.

SUMMARY

Methods for selective extraction of a portion of naphthenic acids from a crude oil are provided. The concentrated portion of naphthenic acids recovered via this method can then be used as surfactants in enhanced oil recovery applications. In one aspect, the method comprises providing a crude oil having a total acid number (TAN) greater than 0.4; mixing the crude oil with an aqueous solution to extract a portion of naphthenic acids from the crude oil into the aqueous solution thereby creating a crude oil/water emulsion; wherein the aqueous solution comprises water and a weak base; separating the aqueous solution containing the portion of naphthenic acids from the crude oil; wherein aqueous solution will contain an additional portion of the crude oil; adding a salt (e.g. sodium chloride) to the aqueous solution, thereby causing the additional portion of the crude oil to separate from the aqueous solution; removing the additional portion of the crude oil from the aqueous solution; and extracting the naphthenic acids from the aqueous solution. The addition of salt can occur prior to separating the aqueous solution containing the portion of naphthenic acids from the crude oil or after separating the aqueous solution containing the portion of naphthenic acids from the crude oil. The addition of salt may also be carried out by using saltwater, such as seawater, as the water in aqueous solution. Mixing of the crude oil with an aqueous alkaline solution may be carried out in a co-current or countercurrent flow or a mixing vessel.

In certain embodiments, the pH of the aqueous solution is from 10.5 to 11.5, e.g. 10.9 to 11.2. In another aspect, the weak base is sodium carbonate. Extracting the naphthenic acids from the aqueous solution can be performed via any suitable means, such as liquid-liquid extraction or solid-phase extraction. In the case of liquid-liquid extraction, the extraction may take place in multiple stages using an organic solvent, e.g. a dichloromethane solvent.

In a preferred embodiment, the portion of naphthenic acids extracted from the crude oil are those naphthenic acids which are soluble in solutions with a pH less than 11.1. Additionally, or alternatively, the portion of naphthenic acids extracted from the crude oil are lower weight naphthenic acids, such as those naphthenic acids having a molecular weight from 200 to 700.

In another aspect, the selective extraction of naphthenic acids may be carried out using a weak anion exchange column, the method comprising: providing a crude oil having a total acid number (TAN) greater than 0.4, contacting the crude oil with a weak anion exchange (WAX) column to recover a portion of naphthenic acids from the crude; and washing the WAX column with a solution or a series of solutions to recover the portion of naphthenic acids. In certain aspects the solution predominantly comprises a high polarity solvent, such as methanol, to wash out lower molecular weight naphthenic acids from the WAX column. The solution will also contain 5-10% acid such as formic acid or acetic acid, so that the acid in solution can displace the naphthenic acids adsorbed on the column. In an alternative aspect, the solution predominantly comprises a low polarity solvent, such as dichloromethane, to wash out higher molecular weight naphthenic acids from the WAX column. In yet another aspect, washing the WAX column is performed via a series of washes starting with a high polarity solution and performing successive washes with decreasing polarity solutions.

Methods for enhanced oil recovery using the portion of naphthenic acids discussed above are also provided, the methods comprising selectively extracting surface active naphthenic acids from an acidic crude oil by any of the methods described above; injecting an aqueous alkaline solution at a pH of less than 11.1 containing the portion of naphthenic acids into a subterranean oil reservoir; recovering oil displaced by the aqueous solution. In certain aspects the aqueous solution containing the portion of naphthenic acids injected into the subterranean oil reservoir is saline, and is derived from seawater or produced water. In a preferred embodiment, the interfacial tension between aqueous solution containing the portion of naphthenic acids and the oil in the subterranean oil reservoir is reduced to less than 1 mN/m, e.g. less than 0.5 mN/m.

DETAILED DESCRIPTION

Definitions

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the apparatuses and processes encompassed are not limited to the specific embodiments described below, but rather, include all alternatives, modifications, and equivalents falling within the true spirit and scope of the appended claims.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting As used herein, the term "hydrophobic" refers to a substance or a moiety, which lacks an affinity for water. That is, a hydrophobic substance or moiety tends to substantially repel water, is substantially insoluble in water, does not substantially mix with or be wetted by water or to do so only to a very limited degree and/or does not absorb water or, again, to do so only to a very limited degree.

As used herein, the term "hydrophilic" refers to substance or a moiety, which has an affinity for water. That is, a hydrophilic substance or moiety tends to substantially attract water, is substantially soluble in water, and/or is substantially miscible with or wetted by water.

As used herein, the term "weak base" refers to a chemical base that does not fully ionize in an aqueous solution.

As used herein, the term "strong base" refers to a chemical base that will fully ionize in aqueous solution.

As used herein, the term "weak acid" refers to a chemical acid that does not fully ionize in aqueous solution.

As used herein, the term "strong acid," refers to a chemical acid that will fully ionize in aqueous solution.

It has now been discovered that desired naphthenic acids can be selectively extracted from whole crude. This produces dual benefits: the selective extraction of natural surfactants while simultaneously upgrading the crude oil by lowering its acidity and corrosive potential. The target crudes of the present disclosure are more acidic crudes, e.g. crudes with a TAN greater than 0.4. This acidity is due to the presence of surface active naphthenic acids in the crude. It is shown in the present disclosure that these surface active naphthenic acids can be selectively extracted using weak bases, e.g. weak base ion exchange or weak base aqueous extraction followed by liquid-liquid extraction or solid-phase extraction into an organic phase. These selectively extracted components, when re-dissolved in aqueous solution act as surfactants to significantly lower the interfacial tension between oil and the aqueous phase. The crude oil remaining after extraction has a reduced acid content resulting in an upgraded crude for refinery processes. For crude oil processing, acids are generally undesirable because they promote corrosion in refinery equipment. Moreover, naphthenic acids disadvantageously stabilize emulsions when hydrocarbons are contacted with water, e.g. during desalting operation, which is also undesirable during refining.

Currently, surfactants are commercially manufactured typically from alcohols, which are chemically modified to append a hydrophilic head group, such as a carboxylic acid, sulfonate, sulfate, phosphate or amine group, to a hydrophobic tail. All types of chemical EOR surfactants used throughout the world are currently made through manufacturing.

The present disclosure provides a cost-effective alternative to the present commercial surfactant manufacturing processes by generating surfactants from interfacially-active acids that are native to crude oils. Additionally, this extraction process could be carried out in the field before crude oil is sold, or at a refinery. Accordingly, the surfactant may be concentrated and conveniently transported to reservoirs of interest, thereby reducing transportation costs associated with transporting large volumes of liquid from the source to the targeted reservoirs. Simultaneously, the removal of select naphthenic acids from crude oils results in upgrading of the crude.

Figure 1:
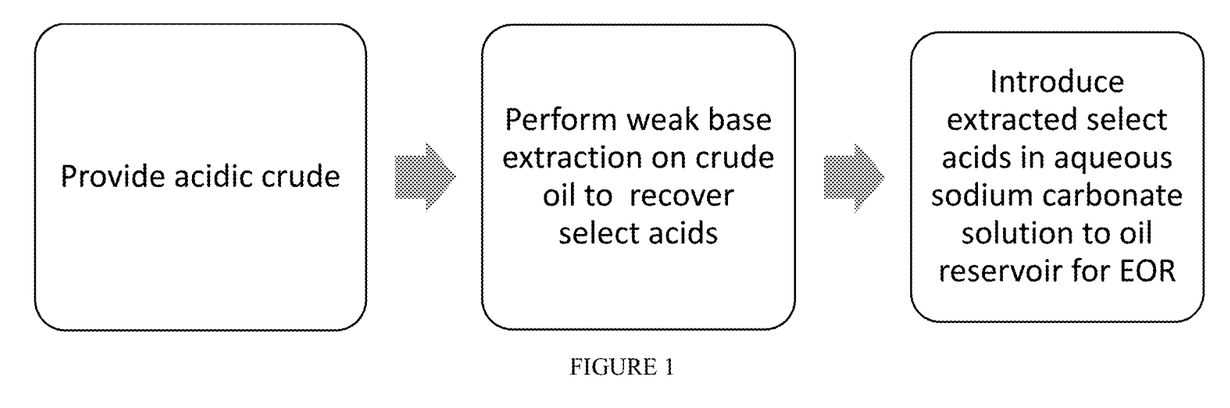
FIG. 1 is a flowchart of a method according to the present disclosure.

The processes disclosed herein can be better understood with reference to the Figures and Examples. FIG. 1 provides a simplified flow chart of the processes disclosed herein. First, an acidic crude is provided. For the purposes described herein, an acidic crude is one with a TAN greater than 0.4. Such crudes have a sufficient amount of surface active naphthenic acids which, when selectively extracted, are a cost-efficient source of naturally occurring surfactant for enhanced oil recovery.

Next, the surface active components of the crude are extracted from the crude by weak base extraction, e.g. weak base ion exchange or weak base aqueous extraction. Weak base ion exchange employs an ion exchange column packed with a weak anion exchange resin. Weak anion exchange resins are typically tertiary or quaternary amines. To carry out the ion exchange process, the crude oil is generally dissolved in an organic solvent such as toluene, and passed through the ion exchange column. The weak anion exchange resin absorbs strong acids from the crude. The column is then washed with solvents containing an acid such as formic acid or acetic acid, which can displace the crude acids from the column. By varying the polarity of the solvents used for washing the column, different molecular weight fractions of the crude acids can be recovered from the column. For example, higher polarity solvents, such as methanol, can be used to recover lower molecular weight acids, and lower polarity organic solvents, such as dichloromethane or toluene, can be added to remove higher molecular weight acids. Polar solvents have large dipole moments (aka "partial charges"); they contain bonds between atoms with very different electronegativities, such as oxygen and hydrogen. Non-polar solvents contain bonds between atoms with similar electronegativities, such as carbon and hydrogen (i.e. hydrocarbons, such as gasoline). In practice, the column could be washed with mixtures of solvents to vary the polarity. For example, one could wash the column first with a 70/30 methanol to water solution to remove lower weight naphthenic acids, then a 100% methanol solvent to remove a slightly higher molecular weight fraction of naphthenic acids, then dichloromethane solvent, then toluene solvent, and so on. The recovered crude acid fractions can be concentrated in a rotating evaporator to remove the solvents.

Weak base aqueous extraction is carried out by mixing the crude oil with an aqueous solution of a weak base. The naphthenic acids to be extracted are more soluble in crude oil than in water when they are not ionized. However, if they are rendered ionic, they become more soluble in water than in the crude oil. An acid becomes ionized when the pH significantly exceeds its pKa value (pKa=negative log of acid dissociation constant), determined by the chemical structure of the acid. Addition of a base will result in an increase in the pH of the aqueous solution. At increased pH, the acidic compound donates a proton to the base, and becomes ionized and water soluble when it loses a proton. When the crude oil is mixed with the aqueous solution of a weak base, the desired stronger naphthenic acids are ionized and transferred into the aqueous phase. The mixing may be carried out in a continuous co-current or countercurrent mixing process, or a batch mixer. The aqueous phase may contain salt, or salt may be added after separation of the aqueous phase to remove excess crude oil.

The naphthenic acids are separated from the aqueous phase and concentrated by liquid-liquid extraction, after lowering the pH of the aqueous solution to the range of 1-3. Liquid-liquid extraction relies on different solubility levels in water and an organic solvent. The organic solvent may be any carbon-based liquid that does not dissolve very well in water, such as dichloromethane or diethyl ether. The naphthenic acids may also be separated from the aqueous phase by solid-phase extraction, such as an ion exchange method, which would be known to a person of skill in the art. Finally, the desired naphthenic acids are recovered in concentrated form after evaporating the organic solvent.

Unlike the prior art, which uses strong base extraction methods, weak base extraction at a lower pH results in a selective extraction of surface active naphthenic acids from the crude. Specifically, by using weak base extraction, where the pH of the aqueous solution is between about 10.5 and 11.5, e.g. about 11, the process avoids the extraction of weak naphthenic acids from the crude oil and predominately extracts lower molecular weight strong naphthenic acids, which are more desirable to use as surfactants. Specifically, the naphthenic acids targeted by this selective weak base extraction are soluble in solutions of pH less than about 11, i.e. less than 11.1 or less than 10.9. The weaker naphthenic acids have higher molecular weight, are less water-soluble, and require higher pH to ionize them. As a result, they are not ionized or rendered water-soluble at the lower pH used here. For example, a 0.1% w/w aqueous solution of sodium carbonate has a pH of about 11, and a 2% w/w aqueous solution of sodium carbonate has a pH of about 11.3, whereas a 1% w/w aqueous solution of sodium hydroxide, as described in the prior art, has a pH of about 13. In crude oil samples used in the examples below the strong naphthenic acids can also be characterized by their lower molecular weight, preferably from 200-700. The target molecular weight for extraction can vary based on the crude oil source, but the solubility in solutions of a pH of about 11 or less is universal. This is beneficial because solutions with pH higher than 11 are unsuitable for EOR because of the risk of scaling and wellbore and formation damage. Comparatively, naphthenic acids extracted by stronger bases, such as various hydroxides, or by strong anion exchange, such as using a quaternary ammonium hydroxide resin, tend to come out of solution even at pH above 12. If the surfactants come out of solution before reaching the formation, they may cause plugging in the well or formation, and may not reach the reservoir to achieve enhanced oil recovery. It is not desirable to inject such a solution, which is not a single phase aqueous solution.

Finally, the extracted surfactants in aqueous solution can be injected to a different existing subterranean oil reservoir for enhanced oil recovery. The different existing subterranean oil reservoir will preferably contain a lower TAN crude than the reservoir from with the naphthenic acids were sourced, i.e. a crude that does not already contain the naphthenic acids that are being injected. The aqueous solution may contain salt, for example, when it is sourced from seawater or produced water. The presence of salt further aids in reducing interfacial tension between oil and the aqueous solution. Several examples were performed to prove the benefits of the processes disclosed herein.

Example 1: Preparation and Extraction 500 cc of a 0.1% w/w sodium carbonate solution in water, having a pH of about 11, was prepared and blended with 500 cc of an acidic crude oil (hereinafter referred to as Crude A) in a blender to generate an oil-in-water emulsion. The resulting emulsion-crude oil mixture was transferred to a separatory funnel and allowed to settle for 2-3 weeks. Over time, the excess crude oil separated from the emulsion and rose to the top of the separatory funnel. A brown-colored, lower-viscosity phase was withdrawn from the bottom of the separatory funnel. The lower-viscosity aqueous phase contains naphthenic acids from crude oil and other crude components emulsified in water. The emulsion is stabilized by the presence of ionized naphthenic acids from crude at the oil-water interface, which imparts negative charge to the droplets. For field applications, this gravity-based separation procedure may be enhanced by centrifugation, or heating to accelerate the separation between the excess crude oil and the emulsion. Here, the removal of excess crude oil components is achieved by the addition of sodium chloride salt in the amount of 5% of the liquid mass and stirred overnight on a magnetic stir plate. Without being bound by theory, the salt screens electrostatic repulsions between the negatively charged crude oil droplets, allowing the excess oil to coalesce and separate from the aqueous phase. In addition, salt also shift the equilibrium distribution of naphthenic acids between oil and water phase, leaving the more water-soluble acids in the aqueous phase and causing the less water-soluble acids to separate into the excess crude oil phase. Subsequently, the excess crude oil separated from the emulsion, leaving behind a light yellow solution (clear microemulsion) with a pH of about 9. This solution is referred to as a microemulsion due to its optical clarity, indicating nanometer-scale domain size of oil droplets, and because of its thermodynamic stability. Dynamic light scattering was performed on this microemulsion, yielding a droplet size of about 6 nm for the oil droplets in the aqueous microemulsion phase. Alternatively, the sodium chloride salt can be added directly to the sodium carbonate solution before mixing with crude oil, instead of adding sodium chloride to the aqueous phase after mixing with crude oil.

Liquid-liquid extraction was performed to recover the naphthenic acids from the aqueous microemulsion. The solution was initially extracted once with dichloromethane, and the dichloromethane solvent was evaporated from the organic extract to recover a dark brown residue. Subsequently, a few drops of 37% hydrochloric acid (HCl) were added to the microemulsion to lower the pH to 1.5-2.5. The acidified microemulsion was repeatedly extracted 3 times with dichloromethane in a separatory funnel, and the organic extracts were withdrawn from the separatory funnel and combined. The dichloromethane solvent was evaporated in a fume hood, to recover a dark brown residue of naphthenic acids. For field applications, the solvent may be recovered and recycled. The concentration of naphthenic acids in the clear microemulsion was found to be approximately 300-400 ppm. The yield may be improved by having multiple stages of mixing between the aqueous sodium carbonate solution and crude oil, or using a higher concentration of sodium carbonate.

Example 2: Characterization

Figure 2:
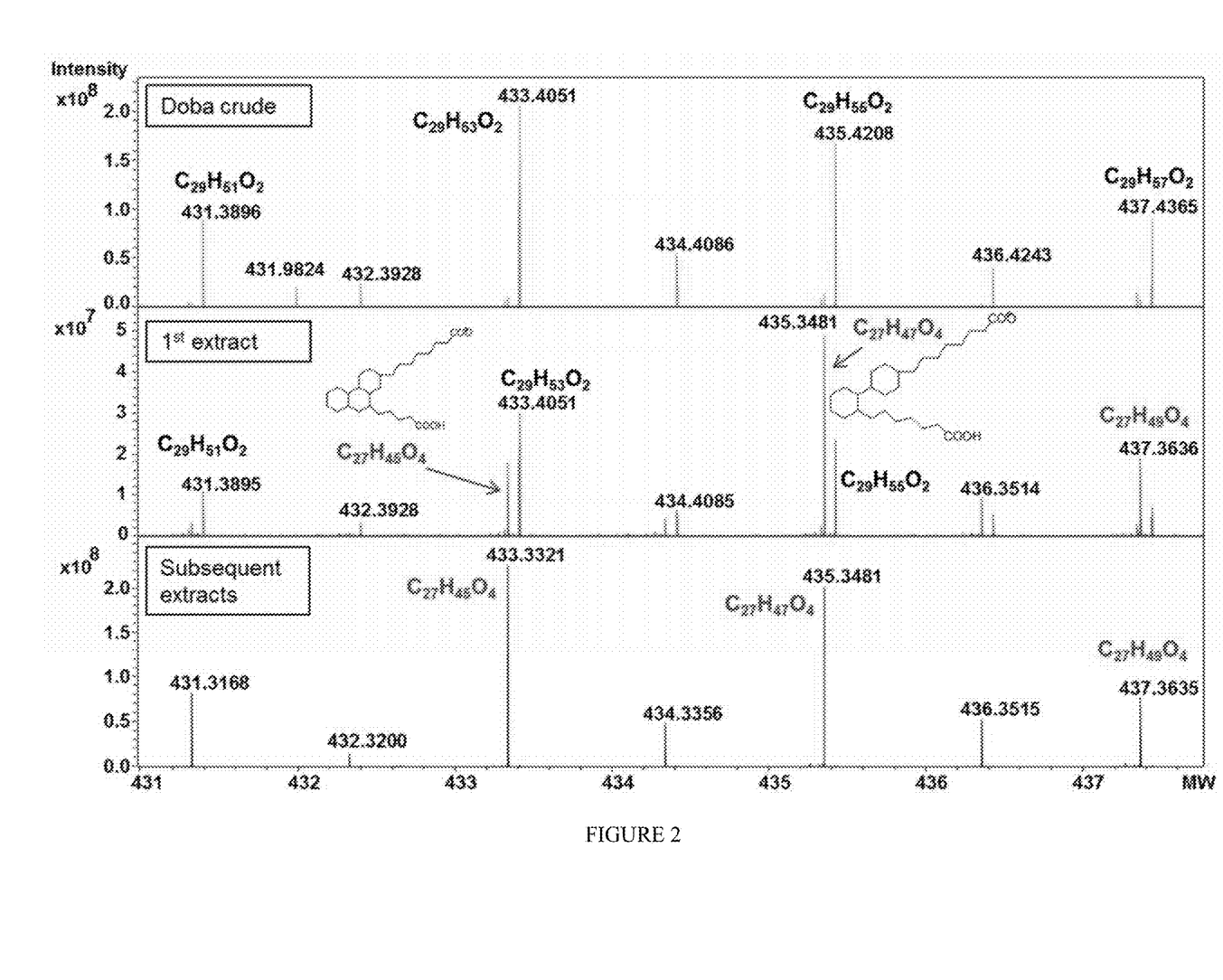
FIG. 2 depicts a region of the mass spectra of a whole crude oil sample and extracted acids from the crude oil sample.

Mass spectrometry, infrared spectroscopy, and NMR spectroscopy were performed on the recovered residues to fully characterize the functional groups present in the residues. The Negative Electrospray Ionization Mass Spectra of the residues obtained from dichloromethane extraction revealed that mono-acids (2-oxygen (2O) species in the data shown in FIG. 2) were predominantly present in the 1st extract, whereas 4O species and 6O species were concentrated in the subsequent extracts, as illustrated in FIG. 2. The first extract was recovered from dichloromethane extraction of the microemulsion before lowering the pH by HCl addition. At this stage, the naphthenic acids are present in their ionized naphthenate salts form, which are more hydrophilic than the un-ionized form. As a result, only the less polar 2O species are transferred to the organic dichloromethane phase. After lowering the pH by HCl addition, the naphthenate salts are converted into the un-ionized naphthenic acids, which are less polar than the ionized form, and even the 4O and 6O species are transferred into the organic phase. Therefore, the first extract is dominated by 2O species and the subsequent extracts are dominated by the 4O and some 6O species.

Potential structures corresponding to the chemical formulae are also depicted in FIG. 2. Only a small region of the mass spectrum is shown below to highlight the degree of mass separation afforded by the analysis.

Figure 3:
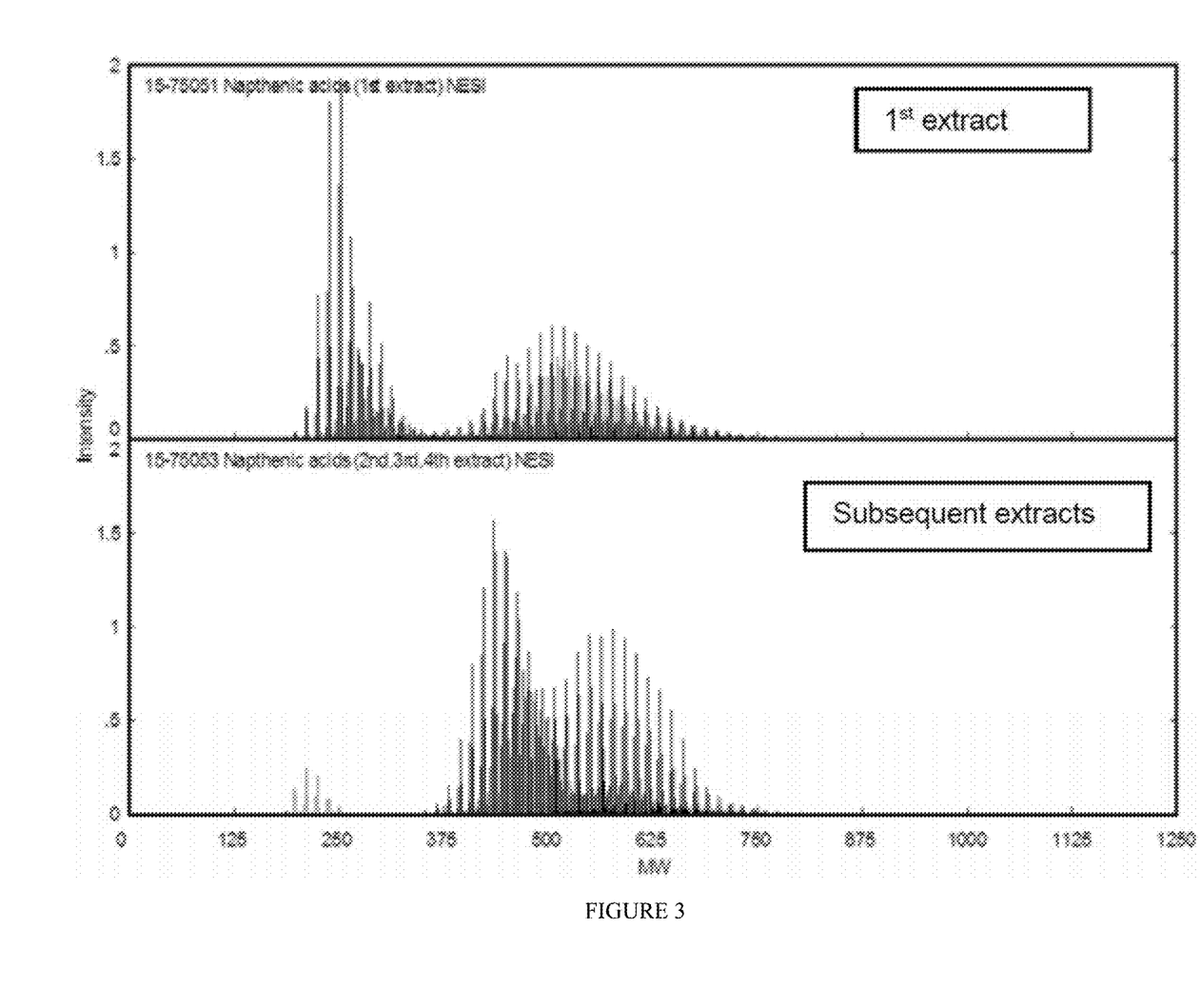
FIG. 3 depicts the negative electrospray ionization mass spectra of the recovered extracts from a crude oil sample.
Figure 4:
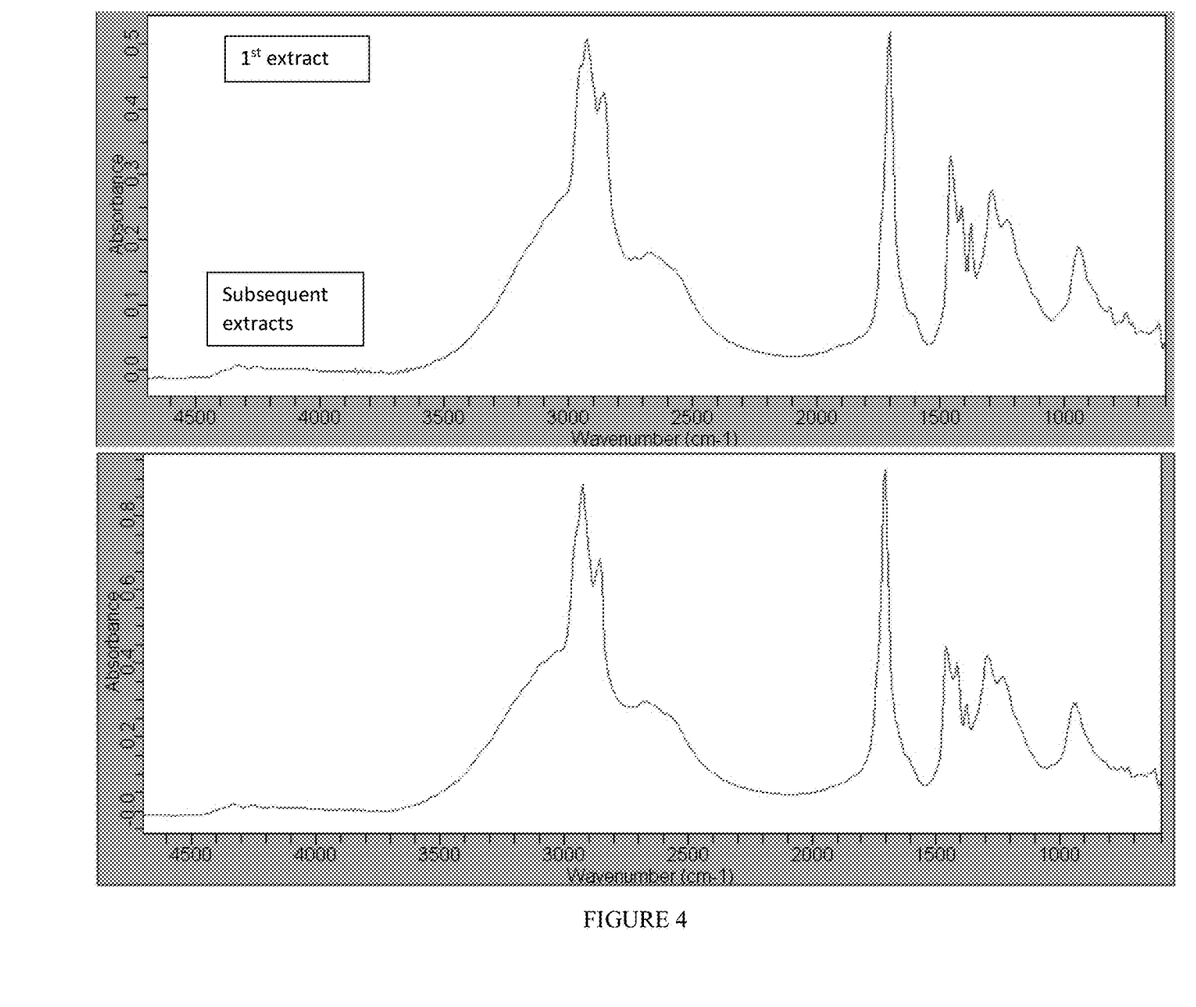
FIG. 4 depicts infrared spectroscopy showing the presence of carboxylic acids in the recovered extracts
Figure 5:
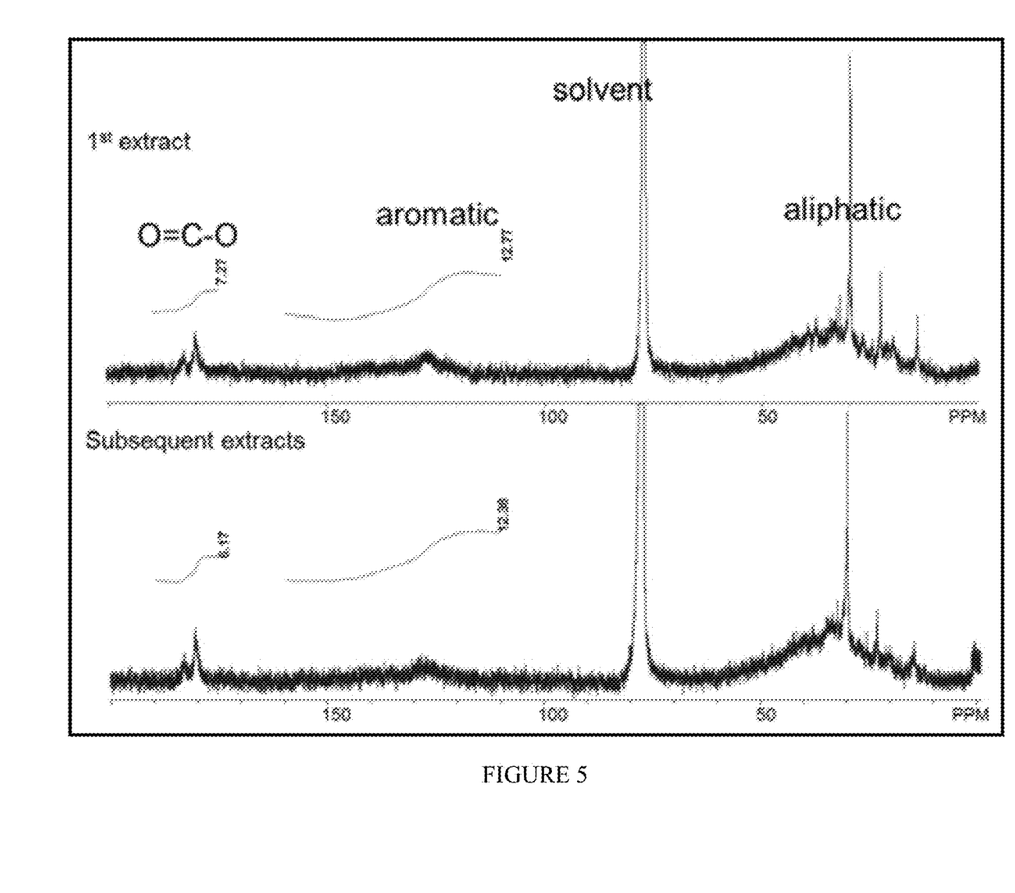
FIG. 5 depicts nuclear magnetic resonance (NMR) spectroscopy showing the presence of carboxylic acids in the recovered extracts.

FIG. 3 shows the full negative electrospray ionization mass spectra, which provides the molecular weight range of the recovered extracts. As can be seen, lower molecular weight, from 200-700, naphthenic acids dominate the spectrum. Additionally, the presence of carboxylic acid functional groups in the extracts was confirmed by infrared spectroscopy, as shown in FIG. 4, the peak at wavenumber of 1700 $cm^{-1}$ confirming the presence of carboxylic acids. NMR spectroscopy further confirmed the presence of carboxylic acid groups in the recovered extracts, as shown in FIG. 5.

Example 3: Extraction and Dissolution in Sodium Carbonate Solution

Naphthenic acids were extracted from a separate sample of emulsion of Example 1 by adding 5% sodium chloride to separate excess oil, and subsequently adding a few drops of HCl to lower the aqueous phase pH to the range of 1.5-2.5, and extracting the resulting microemulsion with dichloromethane 3 times, combining the organic extracts and evaporating the solvent (as described in Example 1). The residue was reconstituted in 0.1% by weight sodium carbonate in water. The resulting solution was used for interfacial tension measurements using a Kruss model no. DSA 100 or DataPhysics model no. OCA 20 LHT pendant drop tensiometer for high values of interfacial tension (>3 mN/m), or a Kruss model no. SITE 100 spinning drop tensiometer for low IFT values (<3 mN/m). Examples 4 and 5 describe the resulting decrease in IFT values.

Example 4: Performance Evaluation Using Heptane

Figure 6:
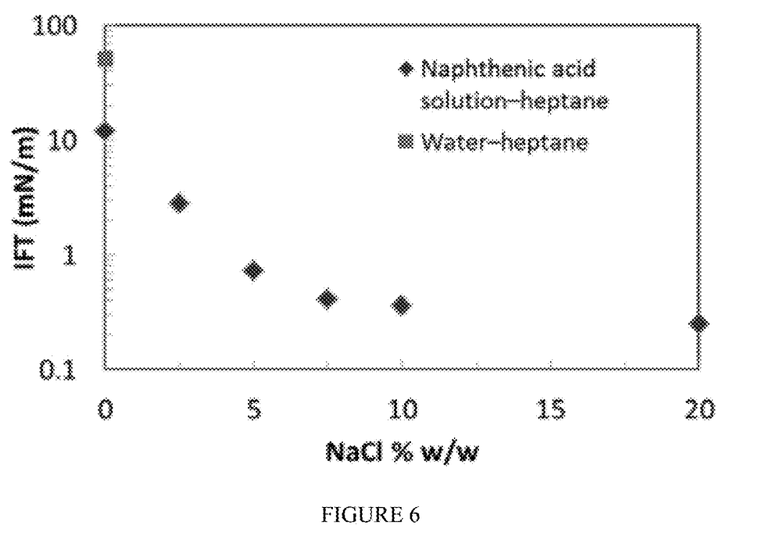
FIG. 6 graphically depicts decrease in interfacial tension that occurs between extracted naphthenic acids in aqueous basic solution and heptane with the addition of sodium chloride.

The interfacial tension of heptane against the naphthenic acid solution at several sodium chloride concentrations was measured, as illustrated in FIG. 6. The control shows the interfacial tension value between heptane and water, with no surfactant. This value is 51 mN/m. The naphthenic acid aqueous solution described in Example 3 lowers the interfacial tension about 80% to between 10-12 mN/m. Low interfacial tension values, much less than 1 mN/m, were achievable with salt addition.

Example 5: Performance Evaluation Using Low TAN Crude Oil

Figure 7:
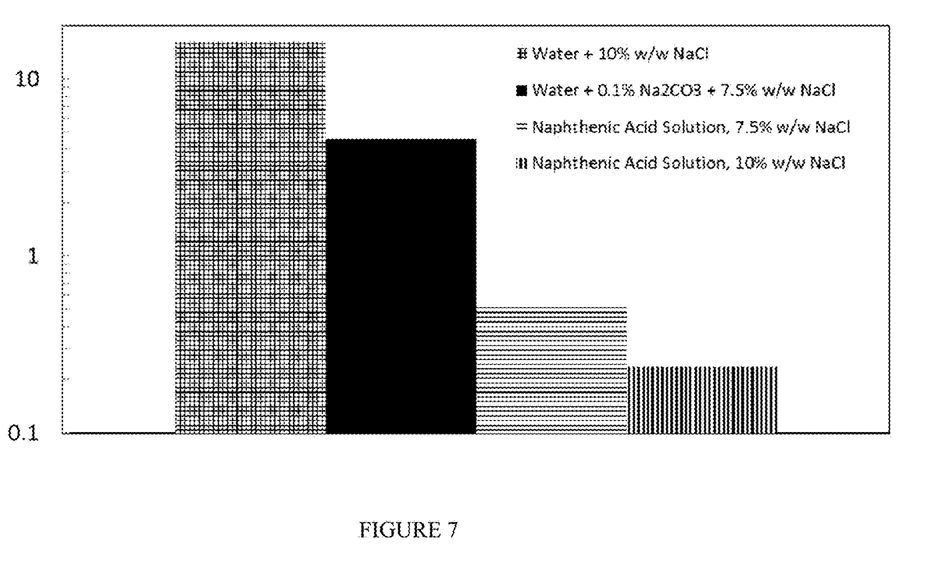
FIG. 7 graphically depicts decrease in interfacial tension that occurs between extracted naphthenic acids in aqueous basic solution with salt and a low TAN crude oil sample as compared to the decrease in interfacial tension that occurs between water with salt and sodium carbonate and a low TAN crude oil sample.

The interfacial tension between a selected low TAN crude oil (different than Crude A) and the naphthenic acid solution was measured at sodium chloride concentrations of 7.5% and 10% w/w. Low interfacial tension values, much below 1 mN/m, were achieved. The chart in FIG. 7 illustrates the measured interfacial tensions for the selected crude against water+10% sodium chloride, water+0.1% sodium carbonate+7.5% sodium chloride, and the naphthenic acid solutions with 7.5% and 10% w/w sodium chloride. The results reveal that interfacial tension below 0.5 mN/m can be achieved by using naphthenic acid solution with salt.

The addition of 10% w/w sodium chloride caused some components of the extract to come out of solution. The IFT of the selected low TAN crude oil was measured against the aqueous phase after sodium chloride addition.

Example 6: Performance of Whole Acids by Strong Base Ion Exchange (Comparison to Prior Art)

Figure 8:
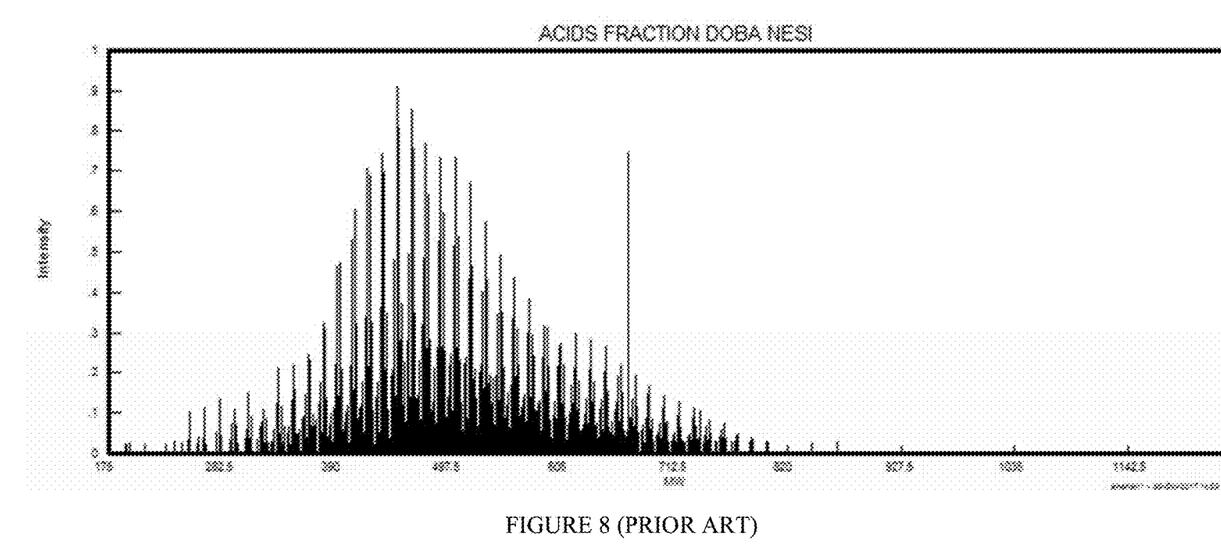
FIG. 8 provides comparative data mass spectrometry regarding the naphthenic acids extracted using prior art methods.
Figure 9:
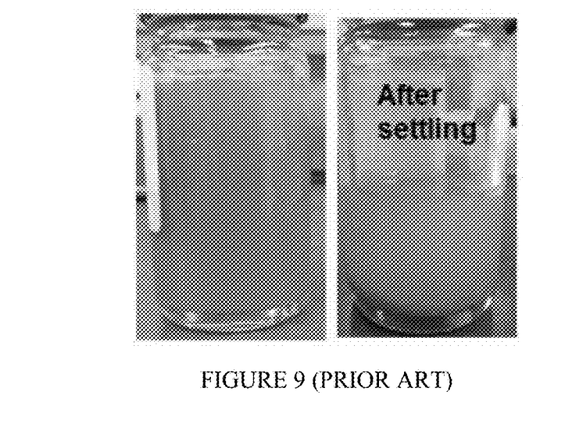
FIG. 9 depicts that naphthenic acids extracted using prior art methods will not stay in solution even at high pH.

Whole acids from Crude A were extracted by ion exchange using quaternary ammonium hydroxide resin, the method disclosed in U.S. Pat. No. 4,037,656. Mass spectrometry, shown in FIG. 8, reveals the presence of higher molecular weight components that are not found in the weak base extraction shown in Example 2 and FIG. 3. The whole acids were mixed in water with 1% w/w NaOH. The pH of the prepared suspension was 12.8 (higher than the values normally practiced in EOR). As shown in FIG. 9, the whole acids are not fully soluble even at this high pH, and come out of solution after settling. Potential addition of alcohols to form a single aqueous phase would lead to added cost, and the phases may nonetheless separate in the reservoir.

Figure 10:
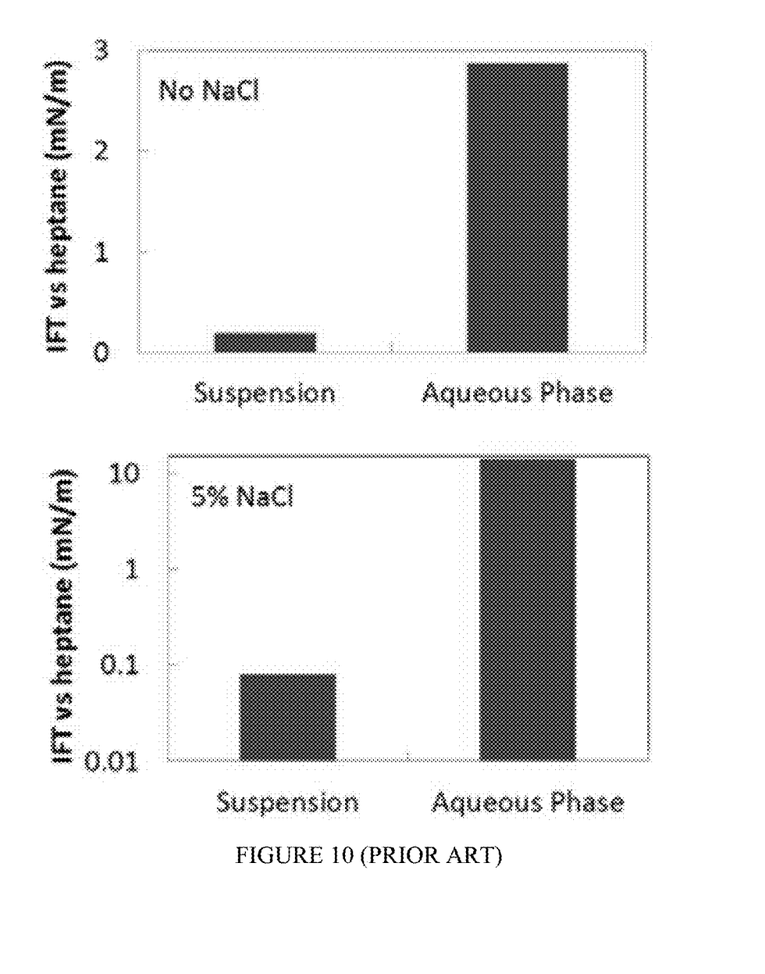
FIG. 10 graphically depicts the interfacial tension both in the absence of salt and the presence of 5% sodium chloride of the prior art suspension vs. the prior art aqueous phase after the acids come out of solution as shown in FIG. 9.

IFT in the absence of salt and in the presence of 5% sodium chloride was measured against heptane, first using the prepared suspension and subsequently using the aqueous phase only after filtering the prepared suspension to remove water-insoluble materials. As shown in FIG. 10, significant IFT reduction was not obtained upon using the aqueous phase only, which indicates that the surface active naphthenic acids do not remain in the aqueous solution under this extraction mechanism. Thus, the whole acids extracted by strong base ion exchange are not suitable for injection in the aqueous phase for EOR applications.

Example 7: TAN Reduction

The TAN of Crude A was lowered from 3.85 mg KOH/g for native crude to 3.07 mg KOH/g after the reaction with aqueous sodium carbonate. For further reduction of acid the remaining oil can be sent through the process noted in Example 1 repeatedly.

ADDITIONAL EMBODIMENTS

Embodiment 1

A method for selective extraction of surface active naphthenic acids from an acidic crude oil, comprising: providing a crude oil having a total acid number (TAN) greater than 0.4; mixing the crude oil with an aqueous solution to extract a portion of naphthenic acids from the crude oil into the aqueous solution thereby creating a crude oil/water emulsion; wherein the aqueous solution comprises water and a weak base; separating the aqueous solution containing the portion of naphthenic acids from the crude oil; wherein the aqueous solution will contain an additional portion of the crude oil; adding a salt to the aqueous solution, thereby causing the additional portion of the crude oil to separate from the aqueous solution; removing the additional portion of the crude oil from the aqueous solution; and extracting the naphthenic acids from the aqueous solution.

Embodiment 2

The method of embodiment 1, wherein the pH of the aqueous solution is from 10.5 to 11.5, e.g. 10.9 to 11.2.

Embodiment 3

The method of embodiment 1 or 2, wherein the adding the salt to the aqueous solution occurs prior to separating the aqueous solution containing the portion of naphthenic acids from the crude oil, or wherein the water in aqueous solution is saltwater and the addition of salt is performed by virtue of the water being saltwater.

Embodiment 4

The method of any of the previous embodiments, wherein the weak base is sodium carbonate.

Embodiment 5

The method of any of the previous embodiments, wherein the extracting is performed via liquid-liquid extraction.

Embodiment 6

The method of any of embodiments 1-4, wherein the extracting is performed via solid-phase extraction.

Embodiment 7

The method of any of the previous embodiments, wherein the salt is sodium chloride.

Embodiment 8

The method of any of the previous embodiments, wherein the portion of naphthenic acids extracted from the crude oil are those naphthenic acids which are soluble in solutions with a pH less than 11.1.

Embodiment 9

The method of any of the previous embodiments, wherein the portion of naphthenic acids extracted from the crude oil are those naphthenic acids having a molecular weight from 200 to 700.

Embodiment 10

The method of any of the previous embodiments, wherein the mixing of the crude oil with an aqueous alkaline solution is carried out in a co-current or countercurrent flow or a mixing vessel.

Embodiment 11

The method of any of the previous embodiments, wherein the extraction of the portion of naphthenic acids from the aqueous solution is carried out through a multistage liquid-liquid extraction using an organic solvent.

Embodiment 12

The method of embodiment 11, wherein the organic solvent is a dichloromethane solvent.

Embodiment 13

A method for selective extraction of surface active naphthenic acids from an acidic crude oil, comprising: providing a crude oil having a total acid number (TAN) greater than 0.4, contacting the crude oil with a weak anion exchange (WAX) column to recover a portion of naphthenic acids from the crude; and washing the WAX column with a solution comprising a polar solvent and an acid to recover the portion of naphthenic acids.

Embodiment 14

The method of embodiment 13, wherein the polar solvent is a high polarity solvent, such as methanol.

Embodiment 15

The method of embodiment 13, wherein the polar solvent is a low polarity solvent, such as dichloromethane.

Embodiment 16

The method of embodiment 13, wherein the washing the WAX column is performed via a series of washes starting with a solution comprising a high polarity solvent and performing successive washes with solutions comprising decreasing polarity solvents.

Embodiment 17

A method for enhanced oil recovery, comprising: selectively extracting surface active naphthenic acids from an acidic crude oil by the method of any of the previous embodiments; injecting an aqueous alkaline solution at a pH of less than 11.1 containing the portion of naphthenic acids into a subterranean oil reservoir; recovering oil displaced by the aqueous solution.

Embodiment 18

The method of embodiment 17, wherein the aqueous solution containing the portion of naphthenic acids injected into the subterranean oil reservoir is saline, and is derived from seawater or produced water

Embodiment 19

The method of embodiments 17 or 18, wherein the interfacial tension between aqueous solution containing the portion of naphthenic acids and the oil in the subterranean oil reservoir is reduced to less than 1 mN/m.

Embodiment 20

The method of any of embodiments 17-19, wherein the interfacial tension between aqueous solution containing the portion of naphthenic acids and the oil in the subterranean oil reservoir is reduced to less than 0.5 mN/m.

Embodiment 21

The method of any of embodiments 17-20, wherein the subterranean oil reservoir holds a crude with a total acid number less than 0.4.

The invention claimed is:

1. A method for selective extraction of naphthenic acids from an acidic crude oil, comprising the following steps in order:
providing an acidic crude oil comprising naphthenic acids and having a total acid number (TAN) greater than 0.4;
mixing the acidic crude oil with an aqueous solution comprising water and a weak base to create an emulsion;
separating an excess of the acidic crude oil from the emulsion and removing the excess acidic crude oil from the emulsion to form a separated emulsion, wherein the separated emulsion comprises the water, the naphthenic acids, and a remaining portion of the acidic crude oil;
adding a salt to the separated emulsion, thereby causing the remaining portion of the acidic crude oil to separate from the separated emulsion;
removing the separated remaining portion of the acidic crude oil from the separated emulsion; and
extracting a portion of the naphthenic acids from the separated emulsion;
wherein the pH of the aqueous solution is from 10.5 to 11.5 and wherein the portion of the naphthenic acids extracted have a molecular weight from 200 to 700.

2. The method of claim 1, wherein the pH of the aqueous solution is from 10.9 to 11.2.

3. The method of claim 1, wherein the weak base is sodium carbonate.

4. The method of claim 1, wherein the t is sodium chloride.

5. The method of claim 1, wherein the extracted portion of the naphthenic acids is soluble in solutions with a pH less than 11.1.

6. The method of claim 1, wherein the step of mixing of the acidic crude oil with the aqueous solution is carried out in a co-current or countercurrent flow or a mixing vessel.

7. The method of claim 1, wherein the extraction of the portion of the naphthenic acids from the separated emulsion is carried out through a multistage liquid-liquid extraction using an organic solvent.

8. The method of claim 7, wherein the organic solvent is a dichloromethane solvent.

* * * * *